Sept. 24, 1974     E. J. HUNTER     3,838,046

SCREENING DEVICE

Original Filed July 24, 1969

INVENTOR.
EDWIN J. HUNTER
BY THOMAS A. LENNON
ATTORNEY

United States Patent Office 3,838,046
Patented Sept. 24, 1974

3,838,046
SCREENING DEVICE

Edwin J. Hunter, Riverside, Calif., assignor to The Toro Company, South Minneapolis, Minn.
Continuation of abandoned application Ser. No. 844,577, July 24, 1969. This application June 8, 1973, Ser. No. 368,310
Int. Cl. B01d 35/02
U.S. Cl. 210—354         2 Claims

ABSTRACT OF THE DISCLOSURE

A pilot operated piston valve having a reciprocable valve element with a metering port extending therethrough, said port being supplied with fluid from the upstream side of the valve, a metering pin being provided in said port. The fluid is supplied to said port through a novel strainer or screening device consisting of a plurality of fins extending radially from a central channel or chamber defined by said fins which receives said pin, said fins having grooved inner faces opposite said metering pin through which metering fluid passes to said metering port, the sides of said fins being minutely spaced from said metering pin to provide a minute elongate straining orifice on each side of said groove in said fin through which the metering fluid is admitted to said grooves or channels and then to said metering port.

---

This is a continuation of application Ser. No. 844,577, filed July 24, 1969, now abandoned.

Many sprinkler control systems are dependent upon a small flow of water that has to be metered through a small orifice. The cross sectional area of the orifice for typical controls is .0002 to .0003 square inches, or an orifice .015 inches to .020 inches in diameter. These are obviously very small orifices which can be easily clogged by debris that is frequently present in much of the water used for irrigation. One method of protecting such an orifice is by the means of a conventional screen. However, the space available for the screen is generally very limited, and since the screen must have considerably smaller openings than the orifice to protect it, such screens quickly plug up and cause malfunctioning of the metering system.

An object of this invention is to provide a novel means of straining the fluid for such metering systems which is self-cleaning and which is not likely to become plugged and inoperative under normal circumstances.

This and other objects will be apparent from the following description and accompanying drawings, in which.

Figure 1:
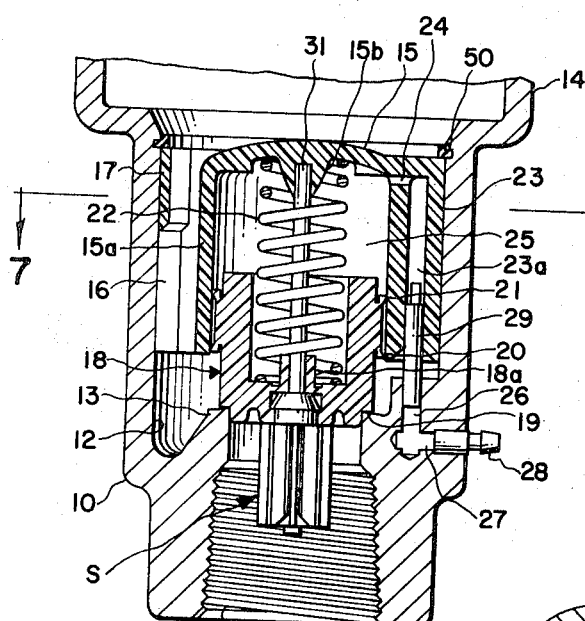
FIG. 1 is a fragmentary vertical sectional of one preferred embodiment of this invention showing a complete valve system embodying the novel strainer device of this invention.
Figure 7:
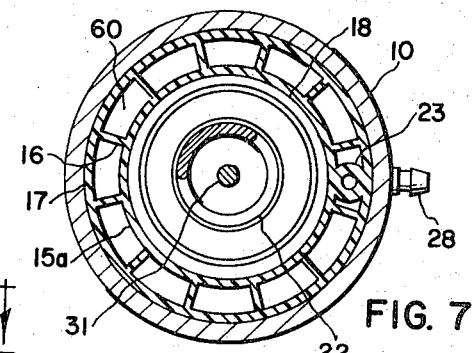
FIG. 7 is a cross-sectional view of FIG. 1, taken on the line 7—7 thereof.
Figure 2:
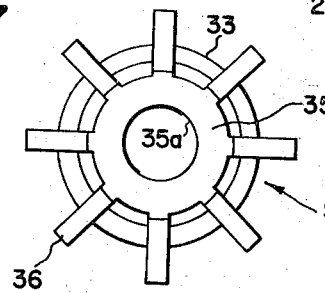
FIG. 2 is a bottom view of the strainer device on an enlarged scale.

Referring to the drawings and particularly to FIG. 1, wherein a straight through valve system is illustrated, a main valve body 10 is shown having an internally threaded inlet 11 at its lower end.

Above the inlet end, the body member is enlarged to form a counterbore 12 forming with the inlet end a shoulder defining an annular fixed valve seat 13. The upper end of the counterbore forms the discharge end of the valve, and above this end the valve body is further enlarged to form a housing 14 for a sprinkler. Alternatively, the upper end may be joined to a conventional fitting for incorporation in a flow line.

The counterbore 12 receives a valve cylinder 15 in the form of an inverted cup having a cylindrical side wall 15a. Spacing ribs 16 extend radially from the cylinder wall 15a to the inner face of the wall of the counterbore and the upper portions of the ribs are surrounded by an integral cylindrical band 17 which also engages the inner face of the counterbore wall. Immediately above the valve cylinder, the counterbore is provided with a groove which receives a retainer ring 50 for securing the valve cylinder in place.

The open end of the valve cylinder 15 is mounted in co-axial relation with the fixed valve seat 13 and the passages 60 between the ribs 16 are for flow of fluid through the valve body.

The valve cylinder receives a piston valve member 18 which is essentially cup shaped and which includes an integral seat 19 constituting a traveling valve seat which engages the fixed valve seat 13.

The valve member has an external annular band which provides a pair of axially spaced apart resilient sealing lips 20 and 21 which engage the inner face of the cylindrical side wall of the valve cylinder to form fluid tight seals.

A compression spring 22 is interposed between the closed end of the valve cylinder 15 and the valve piston 18, said spring being held in position by bosses or spring guides 15b and 18a respectively. The spring urges the piston valve member 18 towards its closed position, and also urges the valve cylinder against the retaining ring.

Interposed between a pair of ribs 16 is a tube 23 which communicates with an opening 24 in the valve chamber 25 provided by said valve cylinder 15 and piston valve member 18.

The valve body includes an axial bore 26 which interests with a horizontal bore or pressure port 27 which communicates with the exterior of the valve body, said port 27 having a fitting 28 installed therein. The axial bore 26 receives a tubular pin 29, said tubular pin also being received by the bore 23a of the tube 23 so as to provide a continuous fluid passage from the fitting 28 to the interior valve chamber 25.

The piston valve member 18 is provided with an axial bore 30 through which a stationary cylindrical metering pin 31 extends, said metering pin being fixedly attached to said valve cylinder 15 by installation in the boss 15b. A metering orifice or keyway 32 extends the ful length of said bore 30 for the passage of metering fluid from the inlet side of the valve to the valve chamber 25. The valve member 18 is slidable on and relative to the metering pin 31 and is in fluid tight sealing relationship therewith, except for said metering orifice 32, the pin 31 forming the fourth side of the metering orifice. To prevent plugging of the metering orifice 32, a new screener or strainer device indicated in its entirety by the letter S is provided.

The strainer device of this invention is an integrally formed part made of plastic or other suitable material and which includes a truncated conically tapered mounting or attachment head 33 at one end which seats in a counterbore 34 in the lower end or outer face of the piston valve member 18, said counterbore 34 communicating with the metering orifice 32. The head 33 has a bore 33a which slidably receives the metering pin 31 and is in fluid tight sealing relationship therewith, and a counterbore 33b which serves to collect the strained fluid and deliver it to the metering orifice 32.

The other end of the strainer device includes a circular ring 35, the bore 35a of which also slidably receives the metering pin 31 in fluid sealing relationship therewith, and extending between and supported by said tapered head 33 and said ring 35 are a plurality of circumferentially equally spaced fins 36 (eight of which are shown in the particular illustrated embodiment), the metering pin 31 extending downwardly into the chamber or channel 37 defined by the inner faces of said fins. The inner ends of the fins are recessed to provide V-shaped grooves or channels 41 defined by the inclined intersecting inner faces of said fins. The outer marginal edges 38a of these faces are spaced from the metering pin so as to provide elongate slots 39 and 40 on opposite sides of each fin, which slots 39–40 for each fin extend substantially the full length of each fin and serve as the straining orifices for said fins. Thus, the eight fins collectively provide sixteen slot type rectangularly shaped straining orifices. These slots 39–40 are spaced from said pin (have a cross-sectional width $x$) which is less than the diameter of the metering orifice 32. Thus, no particle of a size capable of plugging the metering orifice 32 is capable of passing through straining orifices 39–40.

Thus, each of the straining orifices 39–40 is defined by a marginal edge 38a of the fin, the metering pin 31, the head 33 and the ring 35.

The fluid strained by orifices 39–40 of each fin is initially admitted to the channels or grooves 41 defined by the inner faces 38 of each fin and the metering pin 31. Since there is a channel 41 for each fin, there are a total of eight channels 41 for carrying fluid to the metering orifice 32, and all fluid delivered to said metering orifice must pass through one of said channels 41.

Figure 8:
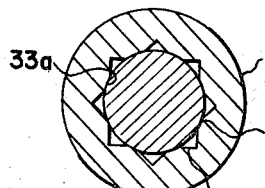
FIG. 8 is a cross-sectional view of the strainer device with the metering pin installed therein, taken on the line 8—8 of FIG. 4.
Figure 9:
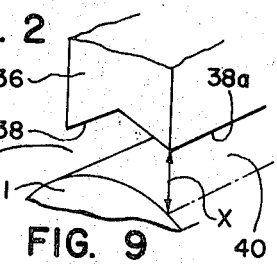
FIG. 9 is a perspective view on an enlarged scale of a portion of a fin and a portion of the metering pin.
Figure 4:
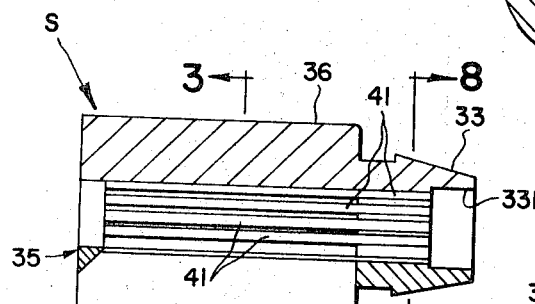
FIG. 4 is a longitudinal sectional view of the strainer device with the metering pin removed taken along the line 4—4 of FIG. 3.
Figures 5, 6:
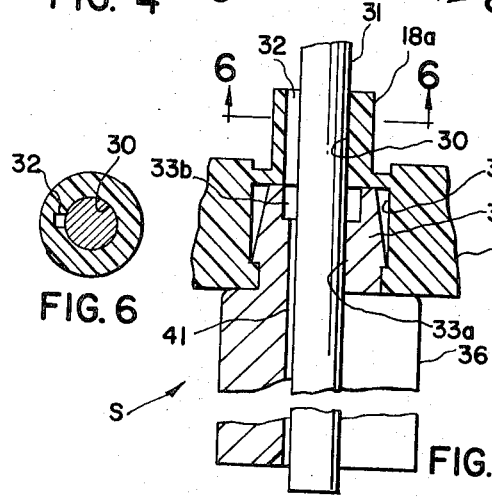
FIG. 5 is a longitudinal sectional view of a portion of the valve and screener device on an enlarged scale.
FIG. 6 is a cross-sectional view taken on the line 6—6 of FIG. 5.
Figure 3:
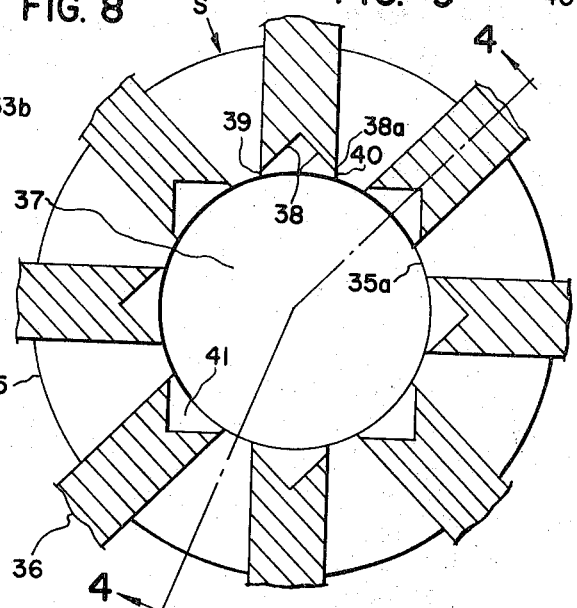
FIG. 3 is a substantially enlarged cross-sectional view of the strainer device taken along the line 3—3 of FIG. 4.

The grooves or channels 41 formed in the fins 36 continue through the head 33 (as best seen in FIG. 8) and communicate with the counterbore 33b to deliver strained fluid thereto.

The inner ends of the fins are recessed to increase the cross-sectional size of the channels 41 enough to accommodate all of the fluid entering each channel 41 through orifices 39–40 along the entire length thereof.

Thus, water entering the inlet side of the valve must first pass through said straining orifices 39–40, and is then conveyed to the valve chamber 25 by successive passage through the channels 41, counterbore 33b, and metering orifice 32.

It will be noted that the strainer S is mounted in the center of the valve and is in such a position that when the valve is opened water is flowing over the screening device and the velocity of the water flow through the valve, parallel to the fins, is sufficient to carry away any of the debris stopped by the strainer.

The valve member 18 and strainer S move axially relative to the metering pin 31, which further enhances the self-cleaning attributes of the strainer device. Thus, particles which are stopped by the slots 39–40 will either be washed away by the fluid passing through the system or will first be dislodged by the activity of the metering pin and then subsequently washed away by the fluid passing through the system.

In operation, the bleed system communicating with the valve chamber is normally closed. Pressure fluid from the upstream side of the piston valve member is screened by the strainer device and then passes through the meter orifice 32 into the valve chamber to exert a force on the piston valve member in excess of the force applied upstream thereof due to the fact that the area of the valve cylinder is greater than the area of the valve seat, when it is desired to open the valve, fluid is bled from the valve chamber 25 via bleed port 24 and the passageways and fitting associated therewith. This relieves the pressure behind the piston and allows the line pressure to force the piston open and permit passage of fluid through the valve.

It will of course, be understood that various changes and modifications of the preferred illustrated embodiment may be made within the spirit and scope of and without departing from this invention, and it is therefore intended to cover all such modifications, in the appended claims.

What is claimed is:

1. A pilot operated fluid valve having a reciprocable valve piston for controlling the flow of fluid through the fluid valve, said fluid valve comprising:

a reciprocable piston having opposed first and second surface areas, said second surface area being smaller than said first surface area;

a housing structure having a major inlet, with a valve seat, for receiving fluid and a major outlet for discharging fluid from said fluid valve as controlled by said second surface of said piston abutting said valve seat, said housing also including a closed end bore for receiving said piston, said first surface area of said piston within said bore defining a valve chamber within said housing;

a metering orifice extending through said piston from said second surface area to said first surface area to provide a fluid flow passageway to said valve chamber;

a port extending from said valve chamber to the external of said valve for controlling the fluid pressure within said chamber; and a self-cleaning screening device surrounding said orifice at said second surface and including a head secured to said piston and having a bore therethrough to slidably receive a metering pin secured to said housing structure, said bore having a diameter slightly larger than the diameter of said pin and in fluid connection with said orifice and said major inlet, wherein the distance between the wall of said head defining said bore and the adjacent surface of said pin is less than the minimal cross sectional distance across said orifice.

2. The valve of claim 1 wherein aid screening device includes:

a counterbore within said head surrounding said orifice;

a plurality of fins extending from said head coaxially with said metering pin to a ring having a bore therethrough to slidably receive said metering pin in fluid sealing relationship therewith, each of said fins including a groove adjacent to said pin to define a channel between said pin and said fin in fluid connection with said counterbore, each of said fins spaced a minute distance from said pin wherein said minute distance is less than the minimal cross sectional distance across said orifice; and wherein said pin extends beyond said ring when said piston abuts said valve seat.

References Cited

UNITED STATES PATENTS

| | | | |
|---|---|---|---|
| 31,352 | 2/1861 | Jenks | 210—449 |
| 343,519 | 6/1886 | Giberson | 210—449 |
| 1,965,912 | 7/1934 | Strawn | 210—354 X |
| 1,781,874 | 11/1930 | Hopkins | 210—354 X |
| 2,717,614 | 9/1955 | Palivos | 210—449 X |

JOHN ADEE, Primary Examiner

U.S. Cl. X.R.

137—547; 210—391, 454